Oct. 8, 1968 C. O. TELFORD 3,404,702
LIQUID FUEL SUPPLY SYSTEM
Filed Sept. 18, 1967

INVENTOR.
CARLYLE O. TELFORD
BY Schapp & Hatch
ATTORNEYS

United States Patent Office 3,404,702
Patented Oct. 8, 1968

3,404,702
LIQUID FUEL SUPPLY SYSTEM
Carlyle O. Telford, Hayward, Calif., assignor to Malsbary Manufacturing Company, Oakland, Calif., a corporation of California
Filed Sept. 18, 1967, Ser. No. 668,348
9 Claims. (Cl. 137—100)

ABSTRACT OF THE DISCLOSURE

A fail-safe heating system for blower-type fuel burners operating on liquid fuel, which cuts off fuel flow upon failure of air flow and also regulates the amount of fuel flow in accordance with the amount of air supplied to the burner. Fuel passes through a valve whose member is attached to a diaphragm exposed on one side to the pressure of the air supplied to the burner and on the other side to the pressure of the fuel, with the pressure of the fuel acting to drive the diaphragm in a direction which moves the valve member toward its seat, and the air pressure operating to drive the diaphragm and valve member in the opposite direction.

Figure 1:
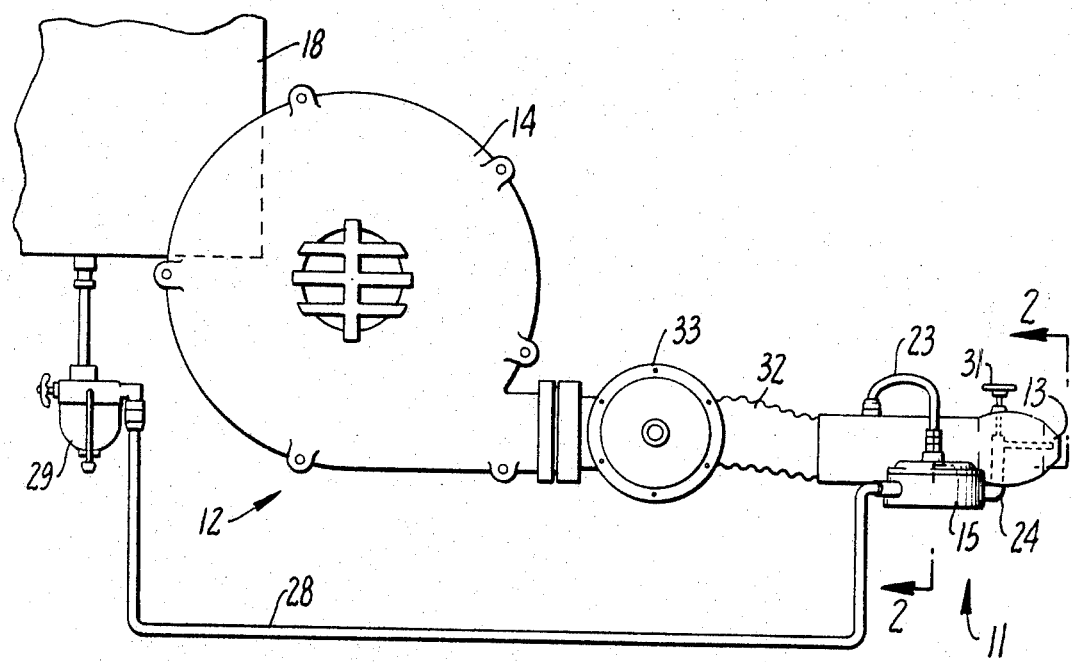

*Background of the invention.*—This invention relates to a liquid fuel supply system, and more particularly to a valve for controlling the flow of fuel to a fuel burner in accordance with the rate of air flow to the burner.

Proportioning valves are widely used with fuel burners to regulate the flow of air through the burner in accordance with the rate of fuel supply to the burner, and to regulate gas flow in accordance with air flow. Where the flow of a fluid fuel is regulated in accordance with the rate of air flow, it is important to provide fail-safe operation of a valve system, to prevent delivery of excess fuel to the burner when the blower cuts off. Otherwise, excess fuel will accumulate and create an explosion hazard. Oil accumulation is wasteful and messy as well.

The fail-safe feature is particularly important in systems in which the fluid fuel is supplied at a positive pressure, as the entire fuel supply might otherwise be dumped through the burner without being ignited. Heretofore, heating systems have been made fail-safe by float valve devices, but such devices had a number of moving parts and were expensive to construct. Where the heating system is one subject to intermittent demand, such as on a portable steam cleaner, problems presented by dribbling through of excess fuel are particularly acute as the repeated start up and shut down can cause a rapid buildup of hazardous fuel accumulations.

*Summary of the invention.*—In the proportioning valve of the present invention, a control diaphragm is exposed on one side to the pressure of the air blown to the fuel burner, and on the other side to the pressure of the fluid fuel. The diaphragm controls movement of a valve member which acts to regulate the rate of fuel flow through the valve. The burner is lower than the fuel supply so a a positive head may be maintained, and the proportioning fuel valve is lower than the burner, so that the side of the control diaphragm facing the fuel is subjected to a positive head of pressure at all times. When air pressure from the blower is less than this positive head of pressure on the fuel side of the diaphragm, the diaphragm is displaced, causing the valve member to contact its seat and cut off fuel flow. When air is being blown to the fuel burner, the pressure of this air acts on the diaphragm to counter the pressure applied to the diaphragm by the fuel, to a degree roughly proportional to the rate of air flow to the burner. When the air pressure on the diaphragm exceeds the fuel pressure, the valve member is moved from its seat until sufficient fuel pressure accumulates to close the valve. This action repeats automatically as required, and in response to flow of fuel to the burner orifice. A further advantage is found when the present invention is used in intermittent demand heaters. Having the proportioning fuel valve below the burner keeps the supply line from the valve to the burner full of fuel, and this provides rapid starting, because the usual waiting period while fuel reaches the burner from the valve is eliminated.

The operation of the valve is fail-safe. The head of fuel lying between the valve and the burner and the pressure of the fuel supplied to the valve both bias the diaphragm in a direction tending to seat the valve member to cut off fuel flow. After the valve closes, removing the pressure of the fuel supply from the diaphragm, pressure is maintained to keep the valve closed by the static head of the portion of the fuel lying between the valve and the burner. At the same time, the fuel is prevented from dribbling out the burner because the valve closure removes the supply pressure. For further safety of operation, the valve is designed to provide a self-cleaning action on the contact area between the valve member and its seat, and the tapered valve member and seat provide a natural bias toward the closed condition under fuel flow.

Accordingly, it is a principal object of the present invention to provide a liquid-fueled heating system of the character described, in which the flow of fuel is proportioned in accordance with the rate of flow of air to the burner of the system.

It is a further object of the present invention to provide a system of the character described which is fail-safe in its operation.

Another object of the present invention is to provide a heating system of the character described in which the hazard of accumulation of unburned fuel at the burner is prevented.

A still further object of the present invention is to provide a liquid fuel supply system for a heating system of the character described which gives a quick start to the burner in response to rapid intermittent use, independently of the length of fuel conduit between the fuel control valve and the burner.

Yet another object of the present invention is to provide a fuel control valve in a heating system of the character described having a positive bias toward the closed condition in the absence of air flow to the burner.

Another object of the present invention is to provide a liquid fuel supply system of the character described which has few moving parts for increased reliability and economy of construction.

Further objects and advantages of the present invention will appear as the specification proceeds, and the new and useful features of the liquid fuel supply system will be fully defined in the claims attached hereto.

Figure 2:
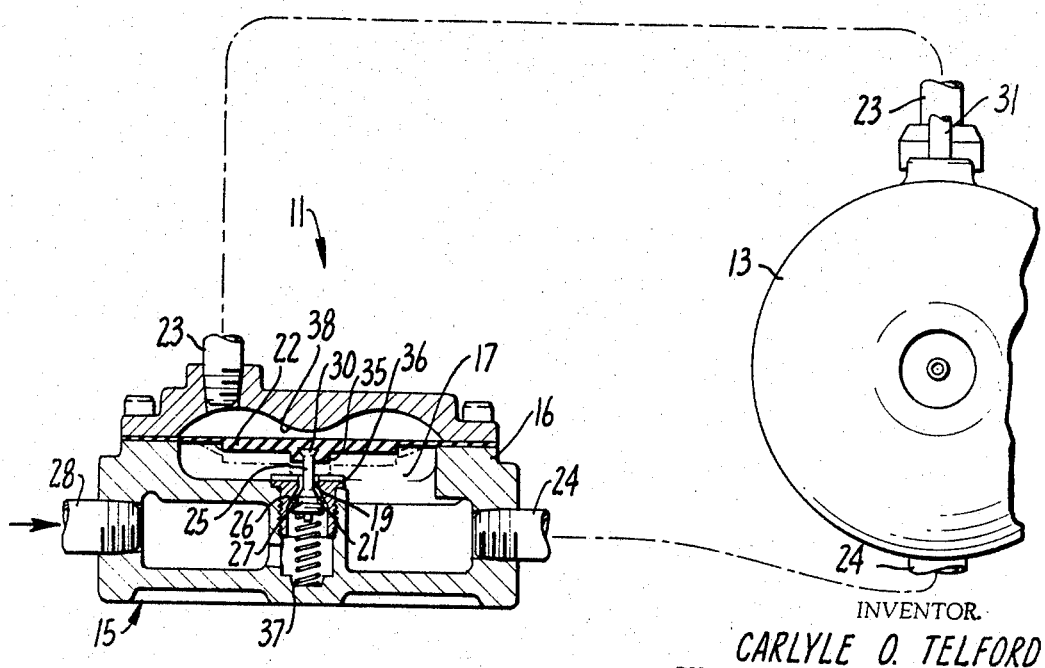

*Brief description of the drawings.*—The preferred form of the present invention is illustrated in the accompanying drawings, forming part of this application, in which:

FIGURE 1 is an overall view of a liquid fuel supply system constructed in accordance with the present invention; and FIGURE 2 is a cross-sectional view, on an enlarged scale, taken approximately along the plane of lines 2—2 of FIGURE 1.

While only the preferred form of the present invention is shown, it should be understood that various changes or modifications may be made within the scope of the claims attached hereto without departing from the spirit of the invention.

*Description of the preferred embodiment.*—Referring to the drawings in detail, it will be seen that the liquid fuel supply system 11 of the present invention is a part of a heating system 12 having a burner 13 for liquid fuel and a blower 14 for supplying air to the burner 13. The liquid fuel supply means 11 includes valve 15 mounted lower than burner 13 and having a housing 16 formed to provide a passage 17 therethrough adapted for connection between the burner 13 and a source 18 of liquid fuel under pressure carried higher than valve 15. A valve seat 19 is located in the passage 17, and a valve member 21 is movable toward and away from the valve seat 19 by a flexible diaphragm 22 positioned in spaced relation to the valve seat 19 and connected for joint movement to the valve member 21. A conduit 23 supplys air under pressure from the blower 14 to the interior of the housing 16 at the side of the diaphragm 22 opposite the valve seat 19.

The air pressure supplied from the blower 14 through conduit 23 forces the diaphragm 22 toward the valve seat 19, moving the valve member 21 away from the seat 19 to permit the fuel to flow through the passage 17 and thence through an outlet conduit 24 to a conventional needle valve 31 providing an adjustable fuel orifice into the burner 13. The system is constructed with the diaphragm 22 located lower than the burner 13 so that a static head of pressure is maintained in the outlet conduit 24 at all times. This static head due to conduit 24 being kept full of liquid provides a fail-safe characteristic by urging the diaphragm 22 away from the valve seat 19 to move the valve member 21 against the seat and terminate the fuel flow when the blower 14 is not operating.

The valve seat 19 here is tapered in a generally conical fashion, with the taper opening outward in the direction confronting the fuel source 18 so that movement of the valve member 21 toward and away from the valve seat 19 regulates the rate of flow of the fuel through the passage 17. The valve member 21 has a stem 25 attached to the side of the diaphragm 22 facing passage 17 and extending through the valve seat 19. The head 30 of the valve member 21 is positioned on the stem 25 at the other side of the valve seat so that movement of the diaphragm 22 away from the seat will close the valve.

For improved characteristics without sacrifice of sensitivity, the diaphragm 22 is formed with a thickened central portion to provide greater stiffness than the periphery. Attached to diaphragm 22 at the center of the thicker portion is a hub 35 of resilient material. The enlarged end 30 of the valve stem snaps into a socket formed in the hub 35, so that the diaphragm may be readily replaced by pulling the hub 35 off the head 30.

Should the enlarged end 30 of stem 25 come loose from the hub 35 for any reason, the valve might fail to close, despite the biasing effect of the tapered configuration of the valve member 21 and the seat 19. To render the valve fail-safe in this eventuality, and to assure a more perfect seal, a spring 37 may be added to bias the valve member 21 toward the closed position. To prevent excessive excursions of the diaphragm 22 which damage the diaphragm or dislodge the head 30 from the hub 35, a stop 38 is here provided by a boss formed in the housing 16 on the side of the diaphragm outside the hub 35, see FIGURE 2.

For ease of installation and repair, the valve seat 19 is here formed in a bushing 36 screwed into the valve housing 16. The top of the bushing 36 is nonflat, here slotted, so that the hub 35 will not obstruct fluid flow should it contact the bushing 36.

Preferably, a resilient sealing ring 26 is disposed on the surface of the valve member 21 confronting the valve seat 19 and is retained thereon by a groove 27 in that surface. The use of a resilient sealing ring 26 accommodates irregularities and provides good sealing of the valve member 21 to the valve seat 19, while at the same time minimizing the area of contact of the valve member 21 with the valve seat 19 to decrease the likelihood of foreign matter being caught between the valve member and the seat in such manner as to prevent full closure of the valve.

The fuel source 18 may be of any suitable type, such as a tank or of a pump and reservoir, and the fuel is supplied along an inlet conduit 28, which may contain filters 29 and other accessories as desired. The needle valve 31 is provided in the outlet conduit 24 for regulating the size of the orifice through which the fuel is expelled into the burner, the size of orifice cooperating with the described effective static head of the fuel to regulate fuel flow in accordance with air flow to the burner.

The blower 14 is connected to the burner 13 by an air conduit 32, which customarily has a conventional automatic air control valve such as the temperature responsive butterfly valve 33 here illustrated. This air control valve regulates the rate of flow of air to the burner 13, and, in accordance with the invention, the fuel flow to the burner is regulated in unison with the air flow by the valve 15 in the manner described.

Locating the diaphragm below the burner not only provides the fail-safe closing bias on the diaphragm 22, but also, by keeping the outlet conduit 24 full of fuel when the burner 13 is off, gives the heating system highly desirable rapid-starting characteristics, by eliminating the wait for the fuel to travel up the outlet conduit from the valve 15 to the burner 13. This characteristic permits the outlet conduit to be made quite long without slowing down the response time of the heating system, a factor of considerable importance in systems subject to rapid intermittent demand, such as steam cleaners. However, the usefulness of the present invention is by no means limited to steam generators and hot water boilers, but is of application to a wide range of blower-type liquid fueled heating systems, wherever the positive, fail-safe termination of fuel flow upon air flow cessation is important.

From the foregoing, it may be seen that the liquid fuel to air proportioning system of the present invention provides a sensitive and accurate control which is fail-safe in operation and which prevents the safety hazard of accuulation of unburned fuel at the burner. The system provides a proportioning valve which is positively biased to the closed position in the absence of air flow, and is constructed to provide a quick start to the burner upon demand, independent of the length of conduit between the fuel control valve and the burner.

I claim:

1. In a liquid fueled heating system having a burner for the liquid fuel and a blower for furnishing air to said burner,
    means for supplying liquid fuel to the burner in a desired proportion relative to the supply of air, comprising
        a housing formed to provide a passage therethrough adapted for connection between the burner and a source of liquid fuel under pressure,
        a valve seat in said passage,
        a valve member movable toward and away from said valve seat,
        a flexible diaphragm positioned in spaced relation to said valve seat and connected for joint movement to said valve member, and
        a conduit adapted for supplying air under pressure from the blower to the interior of said housing at the side of said diaphragm opposite said valve seat whereby such air under pressure will force said diaphragm toward said valve seat so as to move said valve member away from said valve seat,
        said diaphragm being positioned lower than the burner so that the static head of liquid fuel in said housing will urge said diaphragm away from said valve seat and move said valve member against said seat when the blower is not operating.

2. A fuel supply means as described in claim 1 and wherein said valve seat is tapered, whereby movement of said valve member toward and away from said valve seat will regulate the rate of fluid flow through said passage in proportion to the rate of supply of air to the burner.

3. A fuel supply means as described in claim 1 and wherein said valve member is disposed on the side of said valve seat confronting the source of liquid fuel, whereby the flow of fuel through said passage will tend to urge said valve member toward the valve seat in the absence of countering pressure from the air source against said diaphragm.

4. A fuel and air proportioning valve as described in claim 1 and wherein a resilient sealing ring is disposed along the surface of said valve member for seating against said valve seat.

5. A fuel supply means as described in claim 3 and wherein said valve member is coupled to said diaphragm by an elongate member attached to said diaphragm and extending from the side of said diaphragm confronting said seat and through said seat, said valve member being attached to the end of said elongate member opposite to said diaphragm.

6. A fuel supply means as described in claim 1, and wherein said diaphragm is formed of resiliently elastic material with a central portion of greater thickness and a peripheral portion of lesser thickness.

7. A fuel supply means as described in claim 6, and wherein said diaphragm is formed with a hub portion depending from said central portion and having a socket formed therein, and said valve member is attached to one end of a valve stem, the other end of said valve stem being formed into a head portion adapted to be removably snapped into said socket.

8. A liquid fueled heating system, comprising
a burner for the liquid fuel,
a blower for furnishing air to said burner, and
means for applying liquid fuel to said burner in a desired proportion relative to the supply of air, said means comprising
a housing formed to provide a passage therethrough adapted for connection between the burner and a source of liquid fuel under pressure,
a valve seat in said passage,
a valve member movable toward and away from said valve seat,
a flexible diaphragm positioned in spaced relation to said valve seat and connected for joint movement to said valve member, and
a conduit adapted for supplying air under pressure from the blower to the interior of said housing at the side of said diaphragm opposite said valve seat whereby such air under pressure will force said diaphragm toward said valve seat so as to move said valve member away from said valve seat,
said diaphragm being positioned lower than the burner so that the static head of liquid fuel in said housing will urge said diaphragm away from said valve seat and move said valve member against said seat when the blower is not operating.

9. A liquid fueled heating system as described in claim 8, and wherein said valve member is spring biased toward said valve seat.

References Cited

UNITED STATES PATENTS 2,454,511 11/1948 Heymann et al. _____ 158—28 X
3,269,450 8/1966 Licata et al. _____ 158—119

JAMES W. WESTHAVER, *Primary Examiner.*